United States Patent [19]

Ariyoshi

[11] Patent Number: 5,212,764
[45] Date of Patent: May 18, 1993

[54] NOISE ELIMINATING APPARATUS AND SPEECH RECOGNITION APPARATUS USING THE SAME

[75] Inventor: Takashi Ariyoshi, Yokohama, Japan
[73] Assignee: Ricoh Company, Ltd., Tokyo, Japan
[21] Appl. No.: 873,976
[22] Filed: Apr. 24, 1992

Related U.S. Application Data

[63] Continuation of Ser. No. 509,196, Apr. 16, 1990, abandoned.

[30] Foreign Application Priority Data

Apr. 19, 1989 [JP] Japan .................................. 1-101141
Oct. 5, 1989 [JP] Japan .................................. 1-261099

[51] Int. Cl.⁵ ............................ G10L 5/00; G10L 7/08
[52] U.S. Cl. ......................................... 395/2; 381/46; 381/94
[58] Field of Search .................. 395/2; 381/46, 47, 71, 381/94

[56] References Cited

U.S. PATENT DOCUMENTS

| | | | |
|---|---|---|---|
| 4,239,936 | 12/1980 | Sakoe | 381/46 |
| 4,625,083 | 11/1986 | Poikela | 381/46 |
| 4,672,674 | 6/1987 | Clough et al. | 381/71 |
| 4,829,578 | 5/1989 | Roberts | 381/46 |
| 4,932,063 | 6/1990 | Nakamura | 381/94 |

FOREIGN PATENT DOCUMENTS

1512758 9/1977 Fed. Rep. of Germany .
3642591 3/1989 Fed. Rep. of Germany .
1-239596 9/1989 Japan .

OTHER PUBLICATIONS

S. F. Boll, "Suppression of Acoustic Noise in Speech Using Spectral Subtraction," *IEEE Transactions on Acoustics, Speech, and Signal Processing*, vol. ASSP-27, No. 2, Apr., 1979, pp. 113–120.

B. Widrow et al., "Adaptive Noise Cancelling: Principles and Applications," *Proceedings of the IEE*, vol. 63, No. 12, Dec., 1975, pp. 1692–1716.

*Primary Examiner*—David D. Knepper
*Attorney, Agent, or Firm*—Mason, Fenwick & Lawrence

[57] ABSTRACT

A noise eliminating apparatus includes a first feature extracting block for individually extracting a feature quantity X(f) (f = 1, 2, . . . , n) of an input speech containing a noise for n channels (n is an integer), and a second feature extracting block for individually extracting a feature quantity N(f) of the noise for the n channels. The apparatus also includes a noise eliminating block for deriving a first noise eliminating variable k(f) and a second noise eliminating variable d(f) from the feature quantity X(f) of the input speech containing the noise provided for each of the n channels and the feature quantity N(f) of the noise provided for each of the n channels and for generating a feature quantity S(f) of a noise-eliminated input speech in accordance with the following formula:

$$s(f) = X(f) - k(f) \cdot N(f) - d(f).$$

8 Claims, 6 Drawing Sheets

NOISE ELIMINATING APPARATUS AND SPEECH RECOGNITION APPARATUS USING THE SAME

This application is a continuation of U.S. Pat. Application Ser. No. 07/509,196, filed Apr. 16, 1990, now abandoned.

BACKGROUND OF THE INVENTION

The present invention generally relates to a noise eliminating apparatus, and more particularly to a noise eliminating apparatus which eliminates components of background noise contained in a speech signal from a speech input to a speech recognition apparatus. Further, the present invention is directed to a speech recognition apparatus using such a noise eliminating apparatus. The present invention is suitably applied to speech recognition in noisy environments such as vehicles, offices, homes, and factories.

In speech recognition, the presence of background noise in input speech deteriorates the rate of speech recognition greatly. Thus, the elimination of background noise in input speech is a serious problem which has to be solved when putting a speech recognition apparatus to practical use. For example, speech recognition techniques are being directed to applications in a running vehicle, such as audio control, navigation system control, and voice dialing control. It is difficult to use a microphone having a high signal-to-noise ratio (S/N ratio) which is attached in the vicinity of the mouth of a speaker, such as a close-talking microphone. For this reason, a variety of background noises, such as engine sounds, sounds resulting from running wheels, or reproduced sounds from radio or stereo sets, are added to a speech which is input through the microphone. The presence of background noise deteriorates the ability to recognize input speech. Out of the above-mentioned noises, sounds from engines and wheels depend on the vehicle speed and vary greatly depending on the environment. Likewise, reproduced sounds from radio or stereo sets change greatly depending on the frequency and amplitude level thereof. From this point of view, there is a need to provide noise eliminating techniques which are independent of the magnitude of background noise and which are effectively capable of eliminating noise components even when the frequency range of noise changes.

There is known a spectral subtraction method which is generally used for eliminating noise components in a speech input to a speech recognition apparatus, and which uses as features of speech, time-spectral patterns (see "SUPPRESSION OF ACOUSTIC NOISE IN SPEECH USING SPECTRAL SUBTRACTION", S.F. Boll, IEEE Trans. ASSP-27, No.2, pp. 113-120, 1979). The proposed subtraction method includes the steps of averaging an input over a section where there is no voice, holding an averaged input as a noise spectrum and subtracting the noise spectrum from a spectrum of an input speech containing noise components. The subtraction result is output as a finalized speech spectrum. It should be noted that the proposed method is based on an assumption that background noise is stationary on the time base, such as white noise or hoth noise. Thus, the proposed method is effective regarding stationary noise, but less effective regarding dynamic noise. Particularly, when stationary noise has large-level components, the proposed method cannot eliminate such noise components effectively.

There is also known an adaptive noise cancelling method which uses a primary input and a reference input (see ADAPTIVE NOSE CANCELLING: PRINCIPLES AND APPLICATION", B. Widraw et al., Proc. IEEE, Vol. 63, No. 12, pp. 1692-1716, 1975). Further, there is known a nose cancelling apparatus which is related to the above-identified adaptive noise cancelling method (see Japanese Laid-Open Patent Application No. 1-239596 published on Sept. 25, 1989, which corresponds to U.S. Pat. Application S. N. 167,619 filed on Mar. 14, 1988). An adaptive filter disclosed in the above Japanese application corresponds to an improvement of the adaptive noise cancelling method disclosed in the document by Widraw et al, in which a coefficient directed to compensating the difference in amplitude and phase between the two inputs is provided for each of the plurality of frequency ranges so that noise components arising from a plurality of noise sources can be suppressed. However, adaptive noise cancelling methods using two inputs have a disadvantage in that it is difficult to suppress noise effectively due to the fact that the values of the coefficients which are determined when noise is small have large errors. For this reason, a spectral subtraction method using a single input is suitable for dynamic noise having a small level, rather than the spectral subtraction method using two inputs.

One may consider, from the above-mentioned advantages and disadvantages, that a certain threshold level is provided and noise processing is switched between the spectral subtraction method using single input and the spectral subtraction method using two inputs by comparing the level of background noise with the threshold level. However, this has the following shortcomings. First, when the level of background noise is close to the threshold level, the disadvantages of the above two methods appear. Second, it is very difficult to equally handle the noise-eliminated speech patterns which are derived from the two methods. Due to the above-mentioned first and second reasons, the recognition rate is greatly low in the vicinity of noise levels. Third, when noise levels are close to the threshold level, it is necessary to carry out the two methods and this method needs an increased amount of data to be processed.

Moreover, generally, the setting of various coefficients for eliminating noise elements in not only conventional spectral subtraction methods but also adaptive noise cancelling methods is carried out in a section other than a speech section. That is, the procedure for renewing such coefficients is not performed in a speech section. If dynamic noise (level or frequency thereof or position of noise source) changes during the speech section, it is impossible to select appropriate values of coefficients and thus eliminate noise components.

SUMMARY OF THE INVENTION

It is a general object of the present invention to provide an improved noise eliminating apparatus in which the aforementioned disadvantages are eliminated.

A more specific object of the present invention is to provide a noise eliminating apparatus capable of effectively eliminating background noise components from a speech signal containing the same.

Another object of the present invention is to provide a noise eliminating apparatus capable of effectively eliminating background noise components from a speech signal containing the same irrespective of the levels of the background noise components.

Yet another object of the present invention is to provide a noise eliminating apparatus in which coefficients for eliminating noise are renewed as many times as possible so that background noise contained in a speech signal is effectively eliminated in response to a change of noise.

The above-mentioned objects of the present invention are achieved by a noise eliminating apparatus comprising:

first feature extracting means for individually extracting a feature quantity $X(f)$ $(f = 1, 2, \ldots, n)$ of an input speech containing a noise for n channels (n is an integer);

second feature extracting means for individually extracting a feature quantity $N(f)$ of the noise for the n channels; and noise eliminating means, coupled to the first and second feature extracting means, for deriving a first noise eliminating variable $k(f)$ and a second noise eliminating variable $d(f)$ from the feature quantity $X(f)$ of the input speech containing the noise provided for each of the n channels and the feature quantity $N(f)$ of the noise provided for each of the n channels and for generating a feature quantity $S(f)$ of a noise-eliminated input speech in accordance with the following formula:

$$S(f) = X(f) - k(f) \cdot N(f) - d(f).$$

The aforementioned objects of the present invention are also achieved by a noise eliminating apparatus comprising:

first feature extracting means for individually extracting a feature quantity $X(f)$ $(f = 1, 2, \ldots, n)$ of an input speech containing a noise for n channels (n is an integer), the n channels being divided into m groups $(2 \leq m \leq n)$;

second feature extracting means for individually extracting a feature quantity $N(f)$ of the noise for the n channels;

speech section detecting means, coupled to the first feature extracting means and the second feature extracting means, for detecting, for each of the m groups, a speech section where a speech component of the input speech exists by referring to the feature quantity $X(f)$ of the input speech containing a noise component contained in a corresponding one of the m groups and the feature quantity of the noise component; and noise eliminating means, coupled to the first feature extracting means, the second feature extracting means and the speech section detecting means, for deriving a feature quantity $S(f)$ of a noise-eliminated input speech from the feature quantity $X(f)$ of the input speech containing the noise component in the speech section and the feature quantity of the noise component.

A further object of the present invention is to provide a speech recognition apparatus using the above-mentioned noise eliminating apparatus.

This object of the present invention is achieved by a speech recognition apparatus comprising:

a noise eliminating apparatus eliminating a noise contained in an input speech therefrom and outputting a noise-eliminated input speech;

input pattern creating means, coupled to the noise eliminating apparatus, for creating an input pattern of the input speech from the noise-eliminated input speech;

reference pattern storage means for storing reference patterns; and speech recognition means, coupled to the input pattern creating means and the reference pattern storage means, for comparing the input pattern supplied from the input pattern creating means with the reference patterns and for outputting one of the reference patterns which has a highest degree of similarity to the input pattern. The noise eliminating apparatus is configured as described previously.

BRIEF DESCRIPTION OF THE DRAWINGS

Further objects, features and advantages of the present invention will become apparent from the following detailed description when read in conjunction with the accompanying drawings, in which.

DESCRIPTION OF THE PREFERRED EMBODIMENTS

Figure 1:
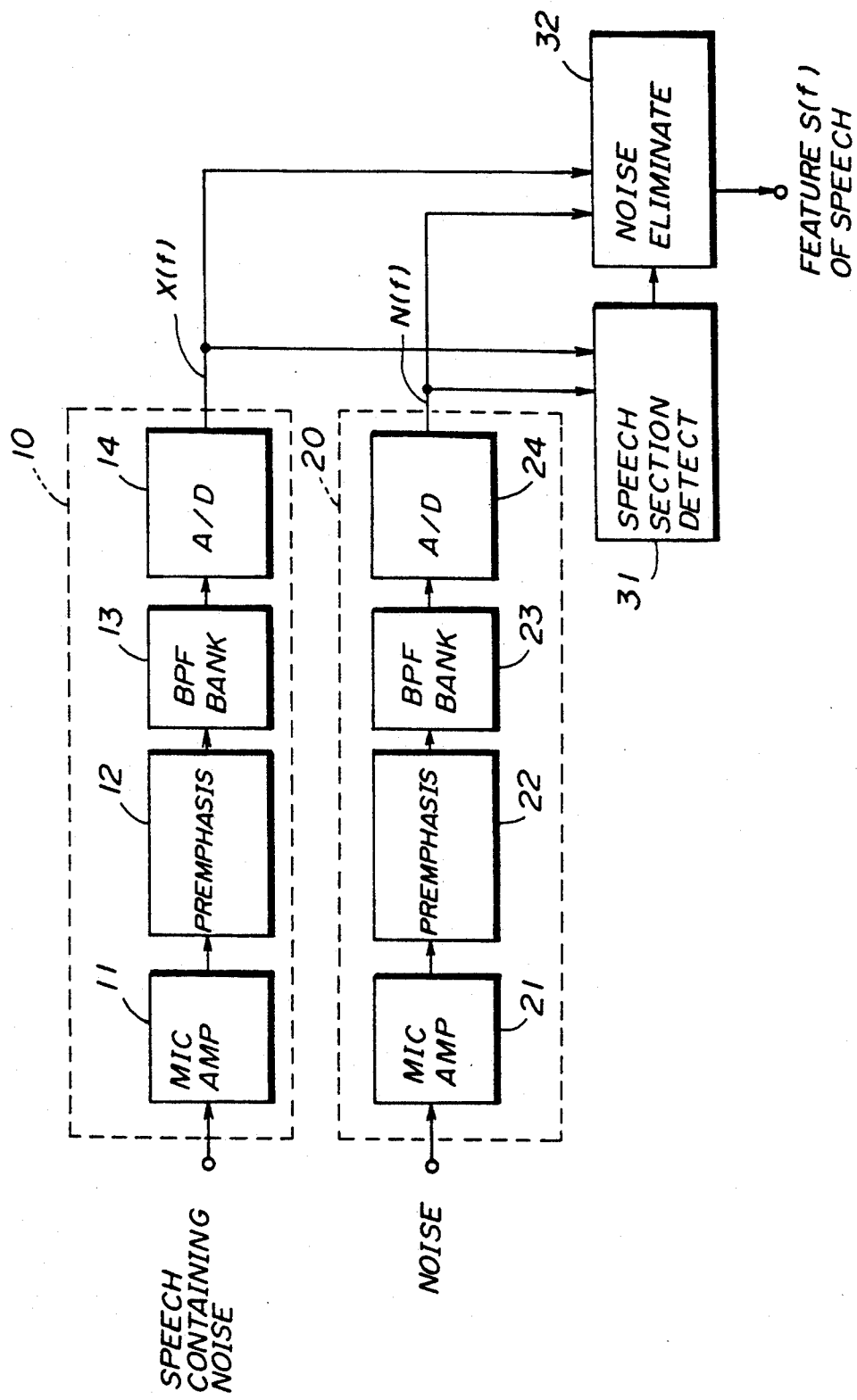
FIG 1 is a block diagram of a noise eliminating apparatus according to a first preferred embodiment of invention.

A description is given of a noise eliminating apparatus according to a first preferred embodiment of the present invention with reference to FIG.1. A microphone amplifier 11 amplifies a signal (primary input signal) which is output from a microphone to which a speech containing background noise is input. A preemphasis block 12 receives the primary input signal from the microphone amplifier 11 and emphasizes a high-frequency component having a small amount of power. A bandpass filter bank 13 is composed of 15 bandpass filters which respectively correspond to 15 channels defined by dividing a voice grade into 15 bands. Further, the bandpass filter bank 13 includes a rectifier and a lowpass filter provided for each of the 15 channels. An analog-to-digital converter 14 (hereafter simply referred to as A/D converter 14) multiplexes the output signals on the 15 channels from the bandpass filter bank 13 and generates a multiplexed signal. Further, the A/D converter 14 samples the multiplexed signal for every 10 milliseconds. A first feature extracting block 10 is made up of the microphone amplifier 11, the preemphasis block 12, the bandpass filter bank 13 and the A/D converter 14, and extracts a power spectrum $X(f)$ of a speech containing a noise. A letter "f" represents numbers individually assigned to the 15 channels.

A microphone amplifier 21 amplifies a signal (reference input signal) which is output from a microphone to which the background noise is input. A preemphasis block 22 receives the reference input signal from the microphone amplifier 21 and emphasizes a high-frequency component having a small amount of power. A bandpass filter bank 23 is composed of 15 bandpass filters which respectively correspond to 15 channels defined by dividing a voice grade into 15 bands. Further, the bandpass filter bank 23 includes a rectifier and a lowpass filter provided for each of the 15 channels. An analog-to-digital converter 24 (hereafter simply refered to as A/D converter 24) multiplexes the output signals on the 15 channels from the bandpass filter bank 23 and generates a multiplexed signal. Further, the A/D converter 24 samples the multiplexed signal for every 10 milleseconds. A second feature extracting block 20 is made up of the microphone amplifier 21, the preemphasis block 22, the bandpass filter bank 23 and the A/D converter 24, and extracts a power spectrum N(f) of the noise contained in the speech. A letter "f" represents numbers individually assigned to the 15 channels.

A speech section detector 31 receives a time-series of power spectra X(f) and N(f), that is, time spectral patterns, which are output from the first and second feature extracting blocks 10 and 20, respectively. Then the speech section detector 31 detects a speech section for each of the frequency bands (15 channels) by the following two steps. At the first step, it is determined whether or not a speech section (a section on the time axis where a speech exists) exists for each of the frequency bands. AT the second step, a speech section on the frequency axis is derived from the detected speech section on the time axis.

$$\sum_{f=1}^{15} X(f) - \sum_{f=1}^{15} N(f) \geq Tha \quad (1)$$

where Tha is a predetermined threshold value. In a case where at the time when a speech section defined above is obtained, a value derived, by the following formula, from power spectrum X(f) of the speech containing noise for each channel obtained at this time, power spectrum N(f) of the noise and the two noise eliminating variables k(f) and d(f) stored in a noise eliminating block 32 (which will be described in detail later) is greater than or equal to a predetermined threshold value Th(f) defined for each channel:

$$X(f) - k(f) \cdot N(f) - d(f) \geq Th(f) \quad (2)$$

a channel or channels f satisfying the above formula (2) being determined to be a speech band or bands, and the remaining channel of channels f determined to be a non-speech band or bands.

The noise eliminating block 32 has noise eliminating variables k(f) and d(f) (f = 1, 2, ..., 15) provided for each of the 15 channels. When the speech section detector 31 discriminates a non-speech section on a channel, the noise eliminating variables k(f) and d(f) are determined by the following formula from power spectrum Xn(f) of speech containing noise obtained on the above channel at this time and noise spectrum Nn(f) of the noise so that the variables are renewed:

| | |
|---|---|
| $k(f) = ((Xn(f)^2 - C^2)/Nn(f)^2)^{\frac{1}{2}}$ | |
| for $Xn(f) > C$ | (3) |
| $k(f) = 0$ for $Xn(f) \leq C$ | (4) |
| $d(f) = Xn(f) - k(f) \cdot Nn(f)$ | (5) | where suffix "n" denotes a non-speech section, and C is greater than zero (C>0). Alternatively, power spectra Xn(f) and Nn(f) can be represented by averages of several samples related to a non-speech section. Power spectrum Sn(f) of a noise-eliminated speech defined at this time is such that Sn(f) = 0.

On the other hand, when the speech section detector 31 detects a speech section on a channel, power spectrum Ss(f) of a noise-eliminated speech is calculated by the following formula from power spectrum Xs(f) of a speech containing noise on the above channel, power spectrum Ns(f) of the noise and the noise eliminating variables k(f) and d(f):

$$Ss(t,f) = Xs(f) - k(f) \cdot Ns(f) - d(f) \quad (6)$$

where suffix "s" denotes a speech section.

Figure 4:
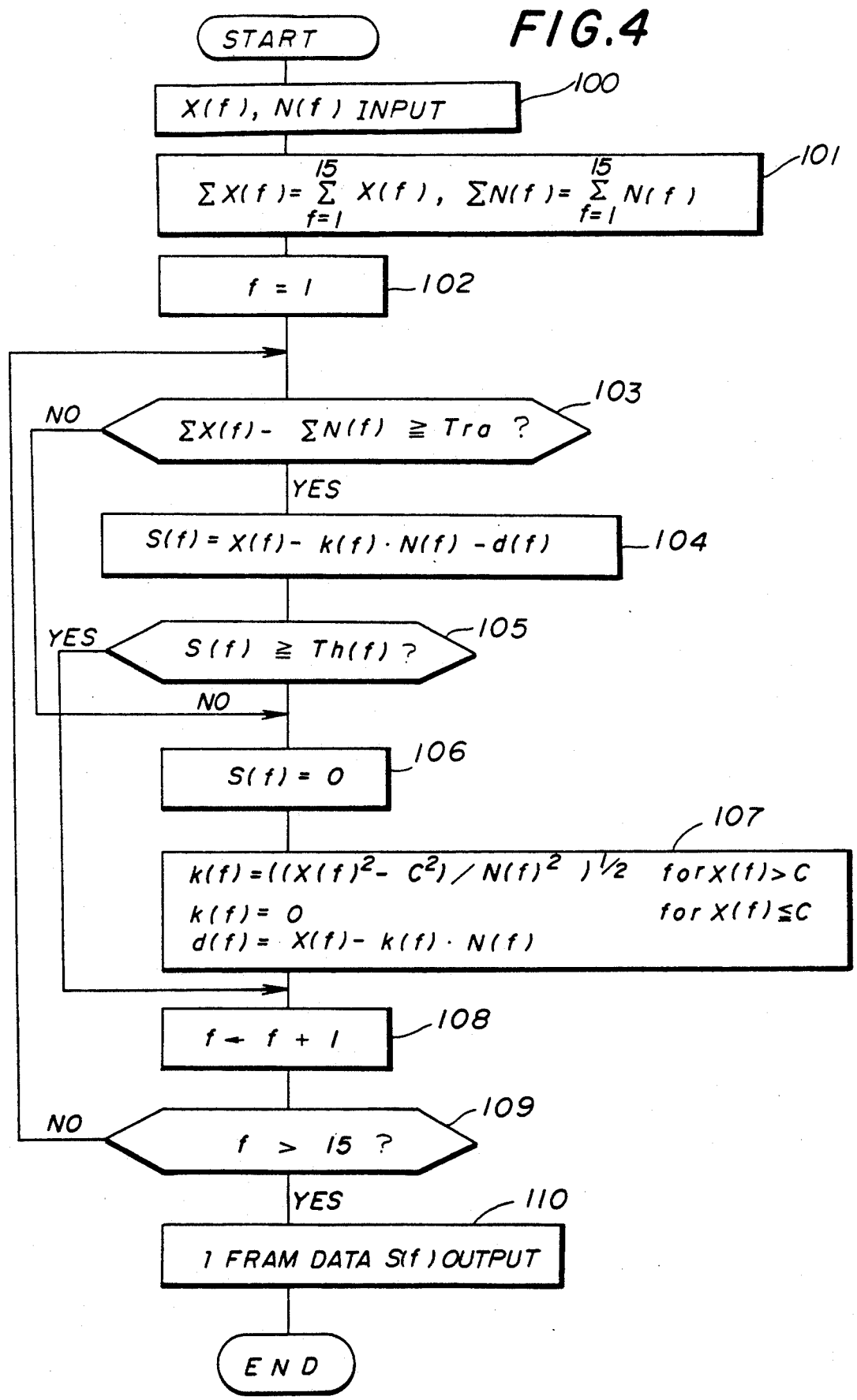
FIG. 4 is a flowchart of a process which is executed by a speech section detector 31 and a noise eliminating block and which is carried out for one sampling time

FIG.4 is a flowchart of a process which is executed by the speech section detector 31 and the noise eliminating block 32 and which is carried out for one sampling time. It will be noted that since the same calculation algorithm is used in the speech section detector 31 and the noise eliminating block 32, the processes thereof are incorporated together.

Referring to FIG.4, X(f) and N(f) are input at step 100. At step 101, $$\Sigma X(f) = \sum_{f=1}^{15} X(f)$$

and $$\Sigma N(f) = \sum_{f=1}^{15} N(f)$$

are calculated. At step 102, f is set to 1. At step 103, it is determined whether or not $\rho X(f) - \rho N(f) \geq$ Tha. When the result obtained at step 103 is YES, power spectrum S(f) is calculated by the formula (2) or (6) at step 104. At step 105, it is determined whether or not $S(f) \geq Th(f)$. When the result at step 105 is NO or when the result at step 103 is NO, the process proceeds to step 106, at which step 0 is written into S(f). At step 107, the aforementioned formulas (3), (4) and (5) are calculated. Then the process proceeds to step 108, which is also executed when the result obtained at step 105 is YES. At step 108, f + 1 is written into f, that is, f is incremented by +1. At step 109, it is determined whether or not f is greater than 15. When the result at step 109 is NO, the process returns to step 103. On the other hand, when the result obtained at step 110 is YES, the process proceeds to step 109, at which step one-frame data S(f) is output. It will be noted that the calculation based on the formulas (3)–(6) is carried out at high speeds achieved by using a logarithmic table and an exponential table.

Figure 3:
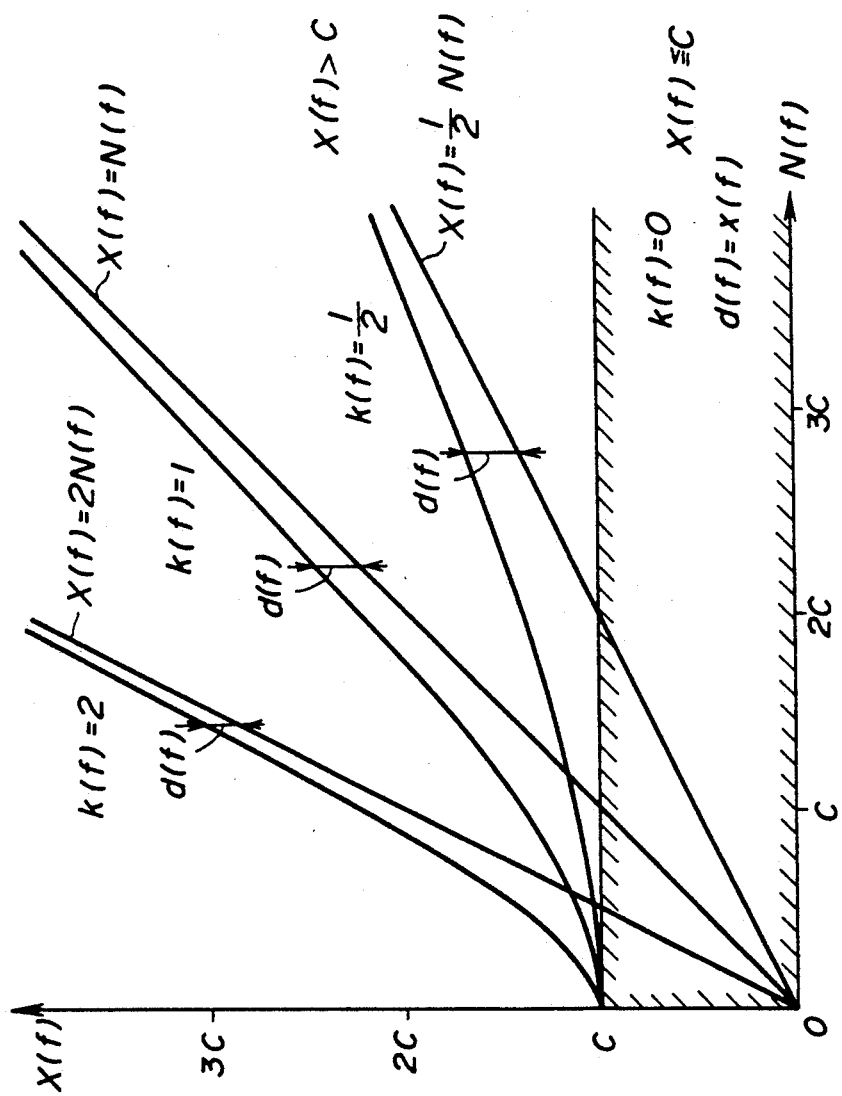
FIG. 3 is a graph showing the relationship among noise variables $k(f)$ and $d(f)$, a feature quantity $X(f)$ of a speech containing noise and a feature quantity $N(f)$ of the noise contained in the speech.

The relationship among Xn(f), Nn(f) and k(f) can be represented by the equation of $Xn(f)^2 \cdot k(f)^2 Nn(f)^2 = C^2$. A graph corresponding to this equation is shown in FIG.3. As shown, the graph corresponding to the equation has a part of a hyperbola. As will be seen from the graph of FIG.3, when background noise is at a considerably high level, that is, when Xn(f), Nn(f) >> C, the following equations are obtained:

$$k(f) = Xn(f)/Nn(f)$$
$$d(f) = 0 \quad (7)$$

Accurately speaking, k(f) and d(f) approach Xn/Nn(f) and 0, respectively. At this time, equation (6) is as follows:

$$Ss(f) = Xs(f) - k(f) \cdot Ns(f) \quad (8)$$

Equation (8) conforms to the aforementioned adaptive noise cancelling method. In contrast, when background noise is at a low level, that is, when $Xn \leq C$ is satisfied, the following equations are satisfied:

$$k(f) = 0$$

$$d(f) = Xn(f) \quad (9)$$

Thus, the aforementioned equation (6) is rewritten as follows:

$$Ss(f) = Xs(f) - d(f) = Xs(f) - Xn(f) \quad (10)$$

Equation (10) conforms to the aforementioned spectral subtraction method.

An alternative speech section determining process to be executed in the speech section detector 31 can be used. In an alternative, the values of $\Sigma X(f)$ and $\Sigma N(f)$ are obtained by means of a filter, which passes signal components in all the 15 channels, instead of the bandpass filters 13 and 23. It is also possible to multiply the value of $\Sigma N(f)$ by a coefficient. It is possible to change the threshold values Tha and Th(f) in accordance with the level of background noise.

In the aforementioned embodiment of the present invention, the values of the noise eliminating variables k(f) and d(f) are maintained as they are in the speech band during the speech section, using the operation results from the speech section detector 31 and the noise eliminating block 32. Alternatively, it is possible to renew the noise eliminating variables k(f) and d(f) when employing a method which is directed to preventing an abrupt change greater than predetermined values of the noise eliminating variables. With this alternative, it becomes possible to renew the noise eliminating variables d(f) and d(f) even in the speech section. The fact that the phase difference between the blocks 10 and 20 (FIG.1) is not compensated in the embodiment, is due to the ground that noise components are eliminated on the frequency base and the sampling is carried out for every 10 milliseconds and that the phase difference is therefore negligible. Of course, it is possible to additionally employ a conventional procedure for compensating the phase difference.

The hyperbola defined by the aforementioned formula (1) can be replaced by a hyperbola defined by the following formula (1'):

$$k(f) = ((Xn(f)^2 - C_1^2)/(Nn(f)^2 + C_2^2))^{\frac{1}{2}} \quad (1')$$

where $C_1, C_2 > 0$ and $Xn(f) > C_1$. A curved line similar to a hyperbola can be employed.

A description will now be given of a speech recognition apparatus which employs the aforementioned noise eliminating apparatus according to the present invention with reference to FIG.2. Referring to this figure, a noise eliminating apparatus 50 is configured as has been described previously, and generates a spectrum S(f) of a noise-eliminated speech from a spectrum of a speech containing noise and a spectrum of the noise. A pattern creating block 60 creates an input pattern of the noise-eliminated speech from the feature quantity S(f) of the input speech supplied from the noise eliminating apparatus 50. A reference pattern memory 70 stores a plurality of reference patterns for an individual speech. A recognition block 80 executes a speech recognition procedure using the input pattern from the pattern creating block 60 and the reference patterns registered in the reference pattern memory 70, and generates, as the recognition result, one of the reference patterns which has the highest degree of similarity to the input pattern.

Input patterns created by the pattern creating block 60 and the reference patterns registered in the reference pattern memory 70 are binary time spectral patterns (BTSP) such as disclosed in "SPEAKER-INDEPENDENT WORD RECOGNITION USING FUZZY PATTERN MATCHING", J. Fujimoto et al., Fuzzy Sets and Systems 32 (1989), pp. 181-191, North-Holand, or in "SPEECH RECOGNITION PROCESSORS USING FUZZY PATTERN MATCHING", T. Ariyoshi et al., IEEE Custom Integrated Circuits Conference 10.6.1 (1988). The recognition process executed in the recognition block 80 conforms to a BTSP method disclosed in these documents. Alternatively, it is possible to create input patterns and realize speech recognition on the basis of a conventional DP matching procedure.

Figure 2:
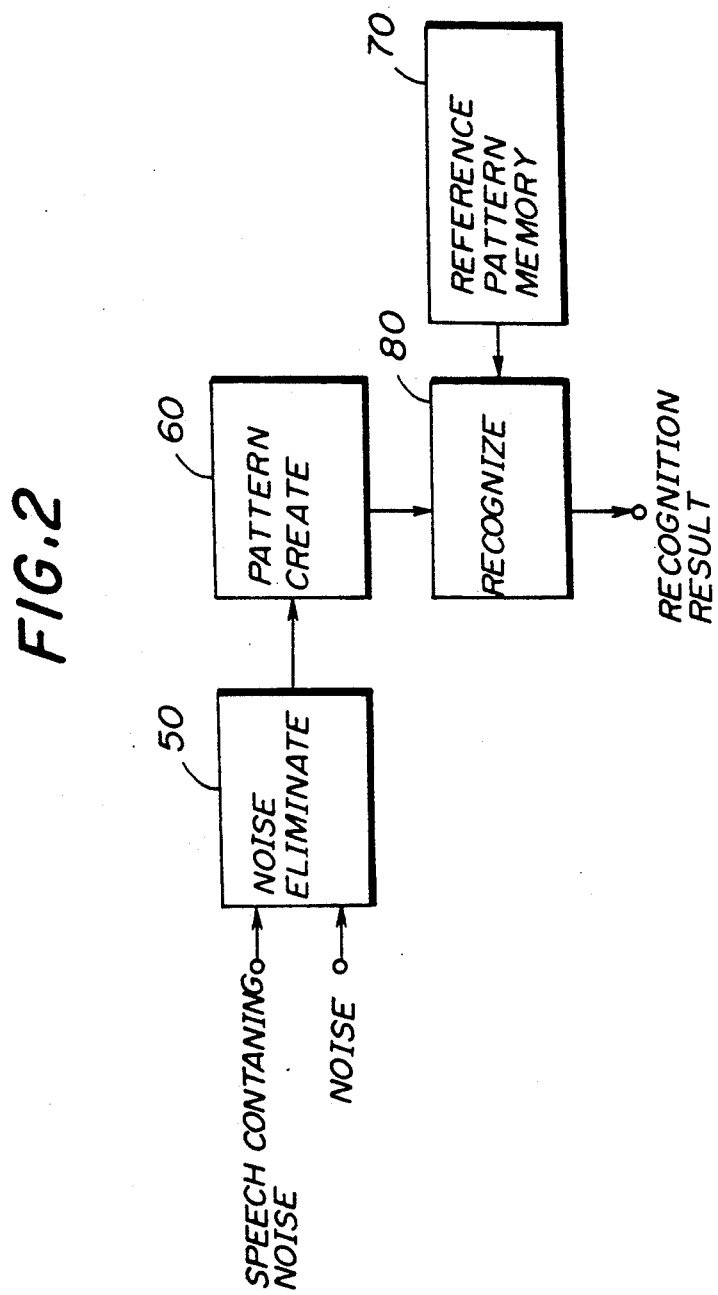
FIG. 2 is a block diagram of a speech recognition apparatus which employs the noise eliminating apparatus shown in FIG.1.
Figure 5:
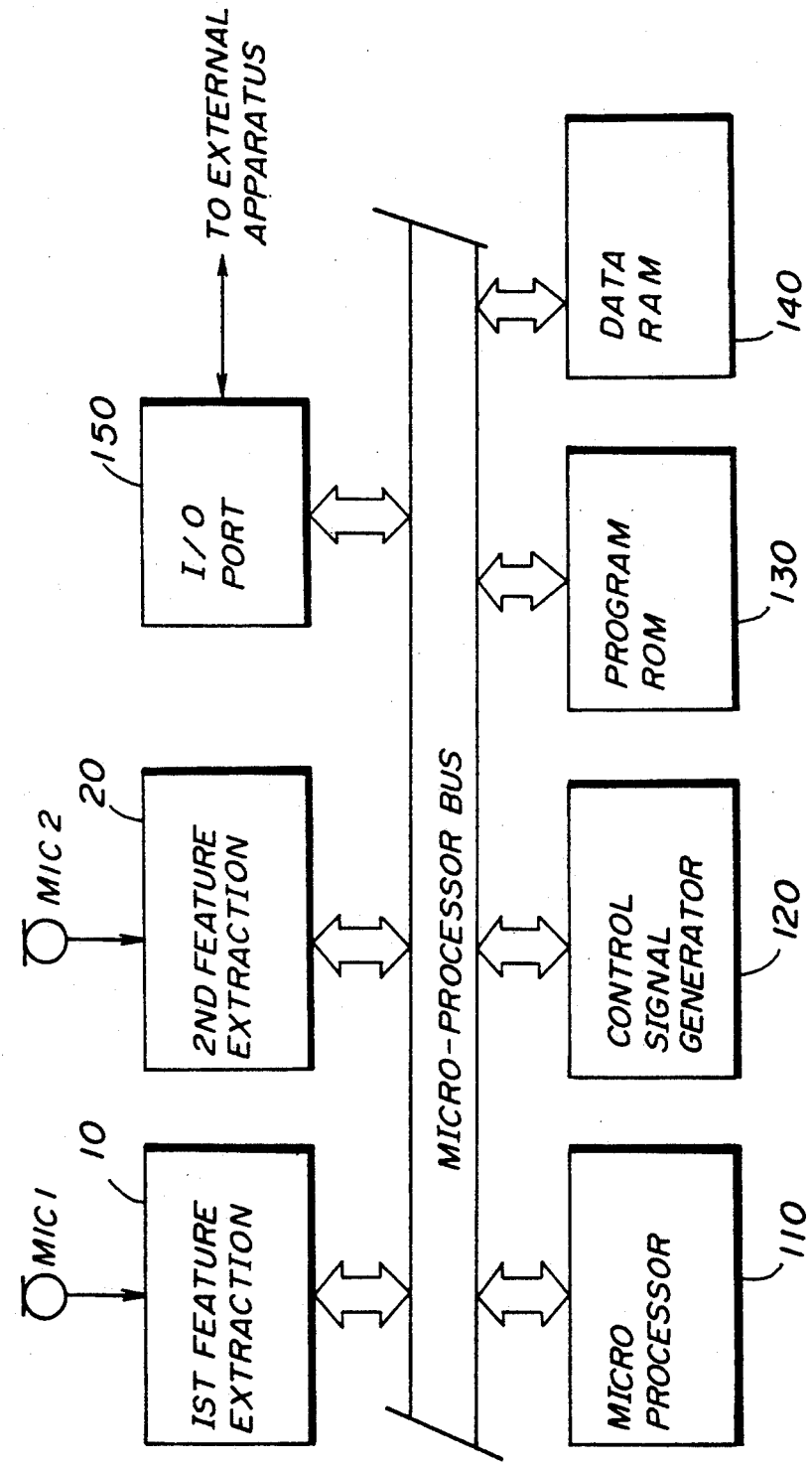
FIG. 5 is a block diagram of a hardware structure of the noise-eliminating apparatus shown in FIG. 1 or FIG. 2.

Referring to FIG.5, there is illustrated a hardware structure of the apparatus shown in FIG.1 or FIG.2. A general microprocessor system is composed of a microprocessor 110, a control signal generator 120, a program ROM 130, a data RAM 140 and an input/output (I/0) port 150. The control signal generator 120 generates a clock signal to be supplied to the illustrated elements, an address decode signal, an interrupt signal (which is generated for every 10 ms) and so on. That is, the control signal generator 120 generates signals necessary for conventional microprocessor systems. When the depicted configuration serves as the noise eliminating apparatus, the program ROM 130 stores programs which implement the processes of not only detecting speech sections of an input speech signal, eliminating noise from the input speech signal and creating input patterns but also establishing the interface between the present apparatus and an external apparatus. On the other hand, when the depicted system serves as the speech recognition apparatus, the program ROM 130 stores programs which implement the processes of detecting speech sections of an input speech signal, eliminating noise from the input speech signal and creating input patterns, recognizing input speech and establishing the interface between the present apparatus and an external apparatus. The data RAM 140 stores the reference patterns of speech used for speech recognition. The I/0 port 150 handles a signal processing based on the conventional RS232C interface and realizes communication with an external apparatus.

Microphones MIC1 and MIC2 are attached to the first and second feature extracting blocks 10 and 20, respectively. The microphone MIC1 inputs a speech including noise, and the microphone MIC2 inputs background noise (reference input). Each of the microphones MIC1 and MIC2 is equally sensitive in all directions.

Figure 6:
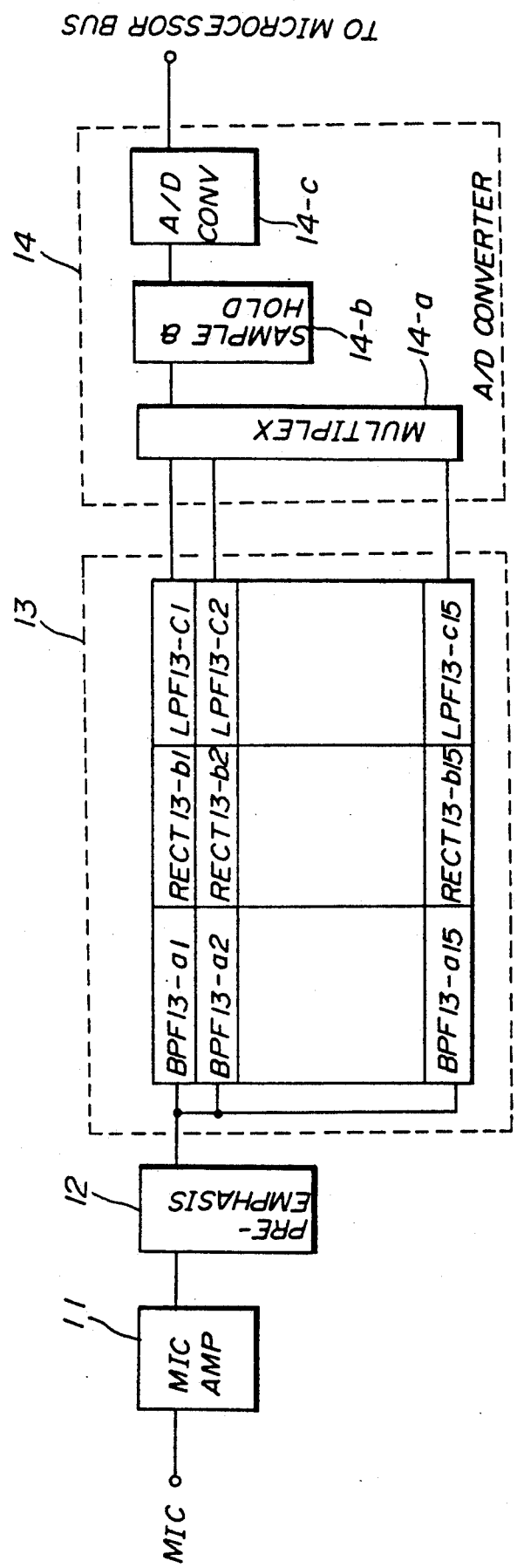
FIG. 6 is a block diagram of a feature extracting block shown in FIG. 1 or FIG. 5.

The first feature extracting block 10 has the same configuration as the second feature extracting block 20, and is configured using conventional elements, as shown in FIG.6. The microphone amplifier 11 amplifies an input speech signal from the microphone MIC1 or MIC2. The gain of the microphone amplifier 11 is selected by taking into account the sensitivity of the microphone being used. The preemphasis block 12 emphasizes signal components having frequencies higher than 1.6 kHz by dB/oct. The bandpass filter 13 consists of a 15-channel filter bank, which is composed of bandpass filters (BPF) 13-a1 through 13-a15, full-wave rectifiers (RECT) 13-b1 through 13-b15 and lowpass filters (LPF) 13-c1 through 13-c15. The characteristics of the bandpass filters (BPF) 13-a1 through 13-a15 are such that Q =6, and the center frequencies thereof are as follows: $f_{01}=250$, $f_{02}=315$, $f_{03}=397$, $f_{04}=500$, $f_{05}=630$, $f_{06}=794$, $f_{07}=1000$, $f_{08}=1260$, $f_{09}=1590$, $f_{10}=2000$, $f_{11}=2520$, $f_{12}=3180$, $f_{13}=4000$, $f_{14}=5040$ and $f_{15}=6350$.

The A/D converter 14 is composed of a multiplexer 14-a, a sample and hold circuit 14-b and an A/D converter 14-c. In response to a related instruction from the microprocessor 110 (FIG.5), the output signals on the 15 channels from the bandpass filter bank 13 are supplied to the multiplexer 14-a, which derives a 12-bit digital signal therefrom.

According to the aforementioned embodiments of the present invention, the spectrum S(f) of noise-eliminated speech is obtained by formula (6) using noise eliminating variables k(f) and d(f) represented by formulas (3), (4) and (5) from the power spectrum X(f) of speech containing noise and the spectrum N(f) of the noise. When the level of background noise is low, the noise eliminating variable d(f) functions to effectively eliminate noise components. On the other hand, when the level of background noise is high, the noise eliminating variable k(f) functions to effectively eliminate noise components. When background noise has an intermediate level, the two noise eliminating variables k(f) and d(f) share the role of eliminating noise. Thus, it becomes possible to effectively eliminate noise having a wide level range and dynamic background noise. It should be appreciated that the algorithm according to the present invention has a small number of determination steps, so that a small amount of programming is needed and the operational speed is very fast.

According to the present invention, the speech section detecting procedures is carried out for every band. When a speech section for a band is detected, the noise eliminating variables k(f) and d(f) related to that band are renewed. Thus, even during a speech section, or more accurately speaking, during a time when there is no speech component in a certain band and there is a speech component in a different band, it is possible to predict a value of the noise component in a band where there is no speech component. With this arrangement, it becomes possible to eliminate dynamic noise effectively.

The speech recognition apparatus according to the present invention includes the above-described noise eliminating apparatus. Thus, it is possible to recognize speech which is uttered in an environment in which background noise has components covering a very wide range or there is dynamic background noise. Further, the noise eliminating procedure can be realized by a very small amount of programming and can be performed at high speeds. Thus, it becomes possible to provide a single CPU with both the noise eliminating control and speech recognition control. It should be noted that conventionally two separate CPUs are used for noise elimination and speech recognition. This leads to a decrease in hardware.

What is claimed is:

1. A noise eliminating apparatus coupled to a recognition device for recognizing an input speech signal, said noise eliminating apparatus comprising:

a) first amplifier means for amplifying a first acoustic signal and for generating a first amplified acoustic signal, said first acoustic signal including the input speech signal to be recognized;

b) first feature extracting means, coupled to said first amplifier means, for generating a feature quantity of said first amplified acoustic signal for each of n channels, said feature quantity including a power spectrum;

c) second amplifier means for amplifying a second acoustic signal and for generating a second amplified acoustic signal;

d) second feature extracting means, coupled to said second amplifier means, for generating a feature quantity of said second amplified acoustic signal for each of said n channels, said feature quantity including a power spectrum;

e) speech section detecting means, coupled to said first and second feature extracting means, for detecting a speech section of said first acoustic signal for each of said n channels by using the feature quantity of said first amplified acoustic signal and the feature quantity of said second amplified acoustic signal; and f) a noise eliminating unit, coupled to said first and second feature extracting means and said speech section detecting means, said noise eliminating unit including:

1) first means for generating a first noise eliminating variable k(f) and a second noise eliminating variable d(f) on the basis of a feature quantity Xn(f) extracted by said first feature extracting means and a feature quantity Nn(f) extracted by said second feature extracting means when said first acoustic signal does not include the input speech signal and thus said speech section detecting means does not detect the speech section; and 2) second means for generating a feature quantity of said input speech signal which is to be supplied to the recognition device on the basis of a feature quantity Xs(f) extracted by said first feature extracting means and a feature quantity Ns(f) extracted by said second feature quantity extracting means when said first acoustic signal includes the input speech signal and thus said speech section detecting means detects the speech section;

wherein said first noise eliminating variable k(f) and said second noise eliminating variable d(f) are defined as a function satisfying the following:

(i) the first noise eliminating variable k(f) approaches zero and the second noise eliminating variable d(f) approaches the feature quantity Xn(f) as the feature quantity Xn(f) becomes smaller than a predetermined value; and (ii) the first noise eliminating variable k(f) approaches Xn(f)/Nn(f) and the second noise eliminating variable d(f) approaches zero as the feature quantity Xn(f) becomes greater than the predetermined value.

2. The speech recognition apparatus as claimed in claim 1, wherein:

the first noise eliminating variable k(f) and the second noise eliminating variable d(f) further satisfy a condition that the first noise eliminating variable k(f) has values which continuously change with respect to a change in the feature quantity Xn(f).

3. A speech recognition apparatus comprising:

a) a noise eliminating apparatus for eliminating a noise contained in an input speech signal therefrom and outputting a noise-eliminated input speech signal;

b) input pattern creating means, coupled to said noise eliminating apparatus, for creating an input pattern of said input speech signal from said noise-eliminated input speech signal;

c) reference pattern storage means for storing reference patterns; and d) speech recognition means, coupled to said input pattern creating means and said reference pattern storage means, for comparing said input pattern created by said input pattern creating means with said reference patterns and for outputting one of said reference patterns which has the highest degree of similarity to said input pattern;

wherein said noise eliminating apparatus includes:

1) first amplifier means for amplifying a first acoustic signal and for generating a first amplified acoustic signal, said first acoustic signal including the input speech signal to be recognized;

2) first feature extracting means, coupled to said first amplifier means, for generating a feature quantity of said first amplified acoustic signal for each of n channels, said feature quantity including a power spectrum;

3) second amplifier means for amplifying a second acoustic signal and for generating a second amplified acoustic signal;

4) second feature extracting means, coupled to said second amplifier means, for generating a feature quantity of said second amplified acoustic signal for each of said no channels, said feature quantity including a power spectrum;

5) speech section detecting means, coupled to said first and second feature extracting means, for detecting a speech section of said first acoustic signal for each of said n channels by using the feature quantity of said first amplified acoustic signal and the feature quantity of said second amplifier acoustic signal; and 6) a noise eliminating unit, coupled to said first and second feature extracting means and said speech section detecting means, said noise eliminating unit including:

A) first means for generating a first noise eliminating variable k(f) and a second noise eliminating variable d(f) on the basis of a feature quantity Xn(f) extracted by said first feature extracting means and a feature quantity Nn(f) extracted by said second feature extracting means when said first acoustic signal does not include the input speech signal and thus said speech section detecting means does not detect the speech section; and B) second means for generating a feature quantity of said input speech signal which corresponds to said noise-eliminated input speech signal on the basis of a feature quantity Xs(f) extracted by said first feature extracting means and a feature quantity Ns(f) extracted by said second feature quantity extracting means when said first acoustic signal includes the input speech signal and thus said speech section detecting means detects the speech section;

wherein said first noise eliminating variable k(f) and said second noise eliminating variable d(f) are defined as a function satisfying the following:

(i) the first noise eliminating variable k(f) approaches zero and the second noise eliminating variable d(f) approaches the feature quantity Xn(f) as the feature quantity Xn(f) becomes smaller than a predetermined value; and (ii) the first noise eliminating variable k(f) approaches Xn(F)/Nn(f) and the second noise eliminating variable d(f) approaches zero as the feature quantity Xn(f) becomes greater than the predetermined value.

4. The speech recognition apparatus as claimed in claim 3, wherein:

the first noise eliminating variable k(f) and the second noise eliminating variable d(f) further satisfy a condition that the first noise eliminating variable k(f) has values which continuously change with respect to a change in the feature quantity Xn(f).

5. A method of eliminating noise especially to facilitate speech recognition, the method comprising:

a) amplifying a first acoustic signal to generate a first amplified acoustic signal, the first acoustic signal including an input speech signal to be recognized;

b) generating a feature quantity of the first amplified acoustic signal for each of n channels, the feature quantity including a power spectrum;

c) amplifying a second acoustic signal to generate a second amplified acoustic signal;

d) generating a feature quantity of the second amplified acoustic signal for each of the n channels, the second feature quantity including a power spectrum;

e) detecting a speech section of the first acoustic signal for each of the n channels by using the feature quantity of the first amplified acoustic signal and the feature quantity of the second amplified acoustic signal; and f) a step including either;

1) generating a first noise eliminating variable k(f) and a second noise eliminating variable d(f) on the basis of a feature quantity Xn(f) extracted in the first generating step and a feature quantity Nn(f) extracted in the second generating step, when the first acoustic signal does not include the input speech signal; or 2) generating a feature quantity of the input speech signal which is to be supplied to a recognition unit on the basis of a feature quantity Xs(f) extracted in the first generating step and a feature quantity Ns(f) extracted in the second generating step, when the first acoustic signal includes the input speech signal;

wherein the first noise eliminating variable k(f) and the second noise eliminating variable d(f) are defined as a junction satisfying the following:

(i) the first noise eliminating variable k(f) approaches zero and the second noise eliminating variable d(f) approaches the feature quantity Xn(f) as the feature quantity Xn(f) becomes smaller than a predetermined value; and (ii) the first noise eliminating variable k(f) approaches Xn(f)/Nn(f) and the second noise eliminating variable d(f) approaches zero as the feature quantity Xn(f) becomes greater than the predetermined value.

6. The method of claim 5, wherein:

the first noise eliminating variable k(f) and the second noise eliminating variable d(f) further satisfy a condition that the first noise eliminating variable k(f)

has values which continuously change with respect to a change in the feature quantity $X_n(f)$.

7. A speech recognition method, comprising:
1) eliminating noise contained in an input speech signal and outputting a noise-eliminated input speech signal by performing the steps of:
   a) amplifying a first acoustic signal to generate a first amplified acoustic signal, the first acoustic signal including an input speech signal to be recognized;
   b) generating a feature quantity of the first amplified acoustic signal for each of n channels, the feature quantity including a power spectrum;
   c) amplifying a second acoustic signal to generate a second amplified acoustic signal;
   d) generating a feature quantity of the second amplified acoustic signal of reach of the n channels, the second feature quantity including a power spectrum;
   (e) detecting a speech section of the first acoustic signal for each of the n channels by using the feature quantity of the first amplified acoustic signal and the feature quantity of the second amplified acoustic signal; and
   f) a step including either;
      (1) generating a first noise eliminating variable $k(f)$ and a second noise eliminating variable $d(f)$ on the basis of a feature quantity $X_n(f)$ extracted in the first generating step and a feature quantity $N_n(f)$ extracted in the second generating step, when the first acoustic signal does not include the input speech signal; or
      (2) generating a feature quantity of the input speech signal which is to be supplied to a recognition unit on the basis of a feature quantity $X_s(f)$ extracted in the first generating step and a feature quantity $N_s(f)$ extracted in the second generating step, when the first acoustic signal includes the input speech signal;
   wherein the first noise eliminating variable $k(f)$ and the second noise eliminating variable $d(f)$ are defined as a function satisfying the following:
      (i) the first noise eliminate variable $k(f)$ approaches zero and the second noise eliminating variable $d(f)$ approaches the feature quantity $X_n(f)$ as the feature quantity $X_n(f)$ becomes smaller than a predetermined value; and
      (ii) the first noise eliminating variable $k(f)$ approaches $X_n(f)/N_n(f)$ and the second noise eliminating variable $d(f)$ approaches zero as the feature quantity $X_n(f)$ becomes greater than the predetermined value;
2) creating an input pattern of the input speech signal from the noise-eliminated input speech signal;
3) comparing the input pattern with stored reference patterns; and
4) outputting one of the reference patterns which has the highest degree of similarity to the input pattern.

8. The method of claim 7, wherein:
the first noise eliminating variable $k(f)$ and the second noise eliminating variable $d(f)$ further satisfy a condition that the first noise eliminating variable $k(f)$ has values which continuously change with respect to a change in the feature quantity $X_n(f)$.

* * * * *